US 011148111B2

(12) United States Patent
Mohammed et al.

(10) Patent No.: US 11,148,111 B2
(45) Date of Patent: Oct. 19, 2021

(54) COATING APPARATUS AND METHOD

(71) Applicant: ASTON UNIVERSITY, Birmingham (GB)

(72) Inventors: Afzal-Ur-Rahman Mohammed, Birmingham (GB); Eman Dahmash, Edgaston (GB); Jiteen Ahmed, Birmingham (GB); Thomas Drew, Kingswinford (GB)

(73) Assignee: Aston University, Birmingham (GB)

( * ) Notice: Subject to any disclaimer, the term of this patent is extended or adjusted under 35 U.S.C. 154(b) by 90 days.

(21) Appl. No.: 15/522,422

(22) PCT Filed: Oct. 19, 2015

(86) PCT No.: PCT/EP2015/074124
§ 371 (c)(1),
(2) Date: Apr. 27, 2017

(87) PCT Pub. No.: WO2016/066462
PCT Pub. Date: May 6, 2016

(65) Prior Publication Data
US 2019/0009235 A1      Jan. 10, 2019

(30) Foreign Application Priority Data

Oct. 30, 2014 (GB) ...................................... 1419308
May 18, 2015 (GB) ...................................... 1508472

(51) Int. Cl.
*B01J 2/12* (2006.01)
*B01J 2/00* (2006.01)
*A23G 3/26* (2006.01)

(52) U.S. Cl.
CPC ...................................... *B01J 2/12* (2013.01);
*A23G 3/26* (2013.01); *B01J 2/006* (2013.01)

(58) Field of Classification Search
USPC .............................. 118/20–30, 666, 667, 692
See application file for complete search history.

(56) References Cited

U.S. PATENT DOCUMENTS 4,343,414 A * 8/1982 Lark ...................... A01C 7/102
111/179
5,302,201 A    4/1994 Lucke
(Continued)

FOREIGN PATENT DOCUMENTS

EP    0 382 160        2/1990
EP    2 289 614 A      3/2011
(Continued)

OTHER PUBLICATIONS

Japanese Office Action dated Feb. 14, 2018 in corresponding Japanese application No. 2017-523920.
(Continued)

*Primary Examiner* — Yewebdar T Tadesse
(74) *Attorney, Agent, or Firm* — Womble Bond Dickinson (US) LLP

(57) ABSTRACT

The present invention relates to an apparatus for coating carrier particles with guest particles. The apparatus comprises a cylindrical processing vessel rotatable about its axis and having solid walls defining a chamber for receiving the particles, and a hollow shaft extending within the chamber at least partly along the axis of the cylindrical processing vessel, the hollow shaft defining a gas flow path connected to a gas inlet. The hollow shaft comprises one or more axially-extending slots or one or more axially-extending rows of apertures allowing fluid communication between the gas flow path and the chamber. The apparatus may be used in a process for coating carrier particles with guest particles, the process comprising: adding the particles to the chamber defined by the cylindrical processing vessel; rotating the cylindrical processing vessel about its axis; and flowing gas
(Continued)

from the gas inlet along the gas flow path in the hollow shaft and into the chamber through the one or more axially-extending slots or one or more axially-extending rows of apertures.

19 Claims, 8 Drawing Sheets

(56) References Cited

U.S. PATENT DOCUMENTS

| | | | | |
|---|---|---|---|---|
| 5,495,418 A * | 2/1996 | Latini | ...................... | A23G 3/26 118/19 |
| 5,698,252 A * | 12/1997 | Kelly | ...................... | A21D 15/08 118/19 |
| 6,197,369 B1 | 3/2001 | Watano et al. | | |
| 2002/0117108 A1 * | 8/2002 | Pentecost | ................... | B01J 2/12 118/303 |
| 2005/0220996 A1 * | 10/2005 | Berger | ................. | A61K 9/2081 427/213 |
| 2005/0228075 A1 * | 10/2005 | Gogos | ................ | C06B 21/0025 523/220 |
| 2009/0017224 A1 * | 1/2009 | Brendel | ............. | B05B 13/0257 427/557 |
| 2011/0140294 A1 * | 6/2011 | Pyke | .......................... | B01J 2/12 264/6 |
| 2015/0007445 A1 * | 1/2015 | Gebhard | ................... | F26B 3/30 34/266 |
| 2016/0256803 A1 * | 9/2016 | Thrasher | .............. | B01D 33/067 |

FOREIGN PATENT DOCUMENTS

| | | | | |
|---|---|---|---|---|
| EP | 2289614 A1 * | 3/2011 | .............. | B01J 2/006 |
| JP | 1986-187929 | 8/1986 | | |
| JP | S63-214340 | 9/1988 | | |
| JP | 01-094937 | 4/1989 | | |
| JP | 1989-297134 | 11/1989 | | |
| JP | 2-207833 | 8/1990 | | |
| JP | H06 63376 A | 3/1994 | | |
| JP | 2014-504948 | 2/2014 | | |

OTHER PUBLICATIONS

International Search Report and Written Opinion for Application No. PCT/EP2015/074124 dated Jan. 21, 2016.
IPO Search Report for Application No. GB1419308.0 dated Apr. 28, 2015.
Decision on Refusal dated Sep. 27, 2018 in Japanese Patent Application No. 2017-523920.
Decision of Refusal issued in the corresponding Japanese Patent Application No. 2019-017983, dated Oct. 26, 2020.

* cited by examiner

COATING APPARATUS AND METHOD

CROSS-REFERENCE TO RELATED APPLICATIONS

This application is a national stage application filed under 35 U.S.C. 371 of International Application No. PCT/EP2015/074124, filed Oct. 19, 2015, which claims priority from Patent Application No. GB 1419308.0, filed Oct. 30, 2014, and GB 1508472.6, filed May 18, 2015, each of which is incorporated by reference herein in its entirety.

FIELD OF THE INVENTION

The present invention relates to an apparatus and a process for coating carrier particles with guest particles.

BACKGROUND OF THE INVENTION

It is known to coat carrier (core/host) particles with fine guest particles in order to modify the physical or chemical properties of the carrier and/or guest particle.

By use of devices that produce high shear, mechanical and compaction forces on the particles, it is possible to increase adhesion of the fine guest particles to the carrier particles to the extent that they become embedded into the surface of the carrier particle. These devices must first de-agglomerate the fine guest particles, then mix the guest particles and the carrier particles and finally adhere the guest particles to the carrier particle using high shear, mechanical and compaction forces.

Early devices (such as the Mechanofusion high shear mill and the Hybridizer dry impactor) were capable of producing the necessary high forces but often caused attrition or even fracture of the carrier particles. Furthermore, they generated heat and thus were not suitable for use with thermo-labile particles.

U.S. Pat. No. 6,197,369B discloses a rotary fluidized bed reactor having an inner drum containing the particles which is rotated to force the particles towards the inner wall of the inner drum. The inner drum is contained within a casing which has an air inlet. Air flows from radially inwards from the casing into the inner drum through slots in the inner drum wall and when the centrifugal force is equalled by the air flow, the particles are fluidized. The mechanical and shear forces in this device are lower than the earlier devices and thus adhesion of the host particles to the carrier particle is reduced. Furthermore, particle size is limited because the particles must not be small enough to pass though the slots (or through a mesh over the slots) in the inner drum wall.

Magnetically assisted impaction coating allows the use of a high shear force with minimal heat generation but has the disadvantage that magnetic particles must be added and subsequently removed from the coated particles leading to a significant risk of contamination.

It is an aim of the present invention to provide an apparatus and process that can be used to apply high shear, mechanical and compaction forces to effect strong adhesion of guest particles to a carrier particle with reduced attrition of carrier particles, that are suitable for thermo-labile particles and which avoid the risk of contamination of the resulting coated particles.

SUMMARY OF THE INVENTION

In a first aspect, the present invention provides an apparatus for coating carrier particles with guest particles, the apparatus comprising:

a cylindrical processing vessel rotatable about its axis and having solid walls defining a chamber for receiving said particles;

a hollow shaft extending within said chamber at least partly along the axis of the cylindrical processing vessel, the hollow shaft defining a gas flow path connected to a gas inlet, wherein the hollow shaft comprises one or more axially-extending slots or one or more axially-extending rows of apertures allowing fluid communication between the gas flow path and the chamber.

In a second aspect, the present invention provides a process for coating carrier particles with guest particles, the process comprising:

providing an apparatus according to the first aspect;
adding the particles to the chamber defined by the cylindrical processing vessel;
rotating the cylindrical processing vessel about its axis;
flowing gas from the gas inlet along the gas flow path in the hollow shaft and into the chamber through the one or more axially-extending slots or one or more axially-extending rows of apertures.

In use, the cylindrical processing vessel containing the particles is rotated about its axis such that collision of the particles against the inner surface of the solid (unperforated) walls of the processing vessel (as a result of centrifugal force) effects break down of any agglomerated guest particles and then allows exposure and adhesion of the guest particles to the carrier particles. The provision of a hollow axially-extending hollow shaft with one or more axially-extending slots/rows of apertures allows gas to emanate in a radially-outwards direction. The radially-outwards directed gas flow is coincident with and thus reinforces the centrifugal force (and thus increases the collision force which in turn increases the de-agglomeration, exposure and adhesion). Since the slot or row of apertures is axially-extending, the radially-outwards airflow forms at least one axially-extending sheet or "blade" of gas which increases the shear forces on the particles. Accordingly, the apparatus allows strong adhesion of the guest particles to the carrier particles without any significant heat generation and without any contamination risk.

Optional features of the invention will now be set out. These are applicable singly or in any combination with any aspect of the invention.

In some embodiments, the one or more slots may be one or more axially- or helically-extending, circumferentially-spaced slots and the process comprises flowing gas from the gas inlet along the gas flow path in the hollow shaft and into the chamber through the axially- or helically-extending, circumferentially-spaced slots.

In some embodiments, the apertures in the or each row may be arranged in an axially-aligned and axially-extending row or in a helically-extending row and the process comprises flowing gas from the gas inlet along the gas flow path in the hollow shaft and into the chamber through the axially-aligned and axially-extending row or in a helically-extending row.

The apertures in the row or one or more of the rows may be selectively blocked. This may be used to modify the axial extent of the gas sheet/blade e.g. by blocking apertures at one or both ends of the row and/or to modify the flow characteristics of the gas flow in the sheet/blade e.g. by blocking alternate apertures in the row.

Any or all of the apertures in the row or one or more of the rows may be adjustable in size. For example, the apertures may be circular and may have an adjustable diameter. This allows focussing of the gas flow into the chamber to adjust the pressure and spread of the gas entering the chamber. For example, apertures with a reduced diameter will result in increased air flow and a more laminar gas sheet/blade which will increase the shear force in the chamber. Larger diameter apertures will result in reduced gas pressure and a more divergent gas sheet/blade which will decrease the shear force in the chamber. The ability to vary the shear force in the chamber allows the apparatus to be used for a wide range of different materials with differing cohesiveness and differing attrition characteristics.

One or more of the apertures positioned towards one or both of the axial ends of the row or one or more of the rows may include a flow director to angle the flow of gas into the chamber towards the axial ends of the chamber. This ensures that the gas sheet/blade is effective throughout the entire chamber and that there is no dead space at the axial ends.

There may be a plurality of (e.g. four) circumferentially-spaced slots/rows of apertures. Preferably, the slots/rows of apertures are equally spaced around the circumference of the hollow shaft. Accordingly, the method may comprise flowing gas from the gas inlet along the gas flow path in the hollow shaft and into the chamber through the plurality of (optionally equally-spaced) circumferentially-spaced slots/rows of apertures.

Where there is a plurality of slots or rows, one or more of the slots or rows may be selectively blocked. This allows control of the strength of the gas flowing from the hollow shaft into the chamber. Where the maximum shear force is required within the chamber, all but one of the slots/rows are blocked so that the pressure of the gas flowing through the one open slot/row in maximised. Where the minimum shear force is required within the chamber, all slots/rows may be unblocked to minimise the pressure of gas flowing through each slot/row. As will be readily appreciated, intermediate shear forces can be obtained by blocking some e.g. one or two of the slots/rows.

In some embodiments, the hollow shaft and thus the gas flow path extends along the entire length of the axis of the cylindrical processing vessel.

In some embodiments, the gas flow path is in fluid communication with a gas outlet, the gas outlet and gas inlet provided at opposing axial ends of the cylindrical processing vessel with the gas flow path extending therebetween. The gas outlets are adjustable to control the gas pressure within the chamber.

In some embodiments, the apparatus further comprises a driving motor for driving rotation of the cylindrical processing vessel. The driving motor may cooperate with and rotate a hub affixed to one axial end of the cylindrical processing vessel, the hollow shaft passing through the axial centre of the hub.

In preferred embodiments, the driving motor is adapted to rotate the cylindrical processing vessel at a speed of between 100 and 4000 rpm, preferably between 800 and 4000 rpm. In these embodiments, the process comprises rotating the cylindrical processing vessel at a speed between 800 and 4000 rpm.

The term "solid walls" is intended to refer to walls that are not perforated such that gas passing into the chamber from the gas flow path cannot pass through the walls of the processing vessel. In some embodiments, the walls of the cylindrical processing vessel may be formed of metal or plastics material e.g. polytetrafluoroethylene (PTFE) or acrylic (optionally carbon-plated acrylic cylinder). The inner surface of the walls of the cylindrical processing vessel are preferably smooth.

In some embodiments, the hollow shaft may be formed of metal e.g. stainless steel or aluminium.

In some embodiments, the apparatus further comprises a temperature sensor, e.g. an infra-red monitoring sensor, for monitoring the temperature in the chamber.

In some embodiments, the apparatus further comprises an electromagnetic emitter for emitting laser light, infra-red energy or microwave energy and the method comprises heating the chamber using electromagnetic radiation such as laser light, infra-red energy or microwave energy.

In some embodiments, the apparatus further comprises a pressure regulating system for regulating the pressure within the chamber. The regulating system includes a pressure sensor which monitors the pressure within the chamber to ensure that there is no build-up of gas pressure which would adversely affect the fluidisation of the guest and carrier particles.

The temperature sensor, pressure regulating system and a rotation sensor on the driving motor may be adapted to provide feedback to a computer system e.g. a computer system running LabVIEW software.

In some embodiments, the apparatus further comprises a gas source connected to the gas inlet. The gas source may be a nitrogen source. The gas source may be adapted to provide gas at a pressure of up to 80 psi e.g. between 20-80 psi at the gas inlet. This gives a gas flow of between 3000-12000 cm3/s. In some embodiments, the apparatus further comprises a gas heater for heating gas from the gas source prior to its introduction into the chamber.

In these embodiments, the process comprises flowing gas (e.g. nitrogen) optionally at a pressure of up to 80 psi e.g. between 20-80 psi from the gas inlet along the gas flow path in the hollow shaft and into the chamber through the one or more axially-extending slots or one or more axially-extending rows of apertures. Use of nitrogen avoids any interaction or oxidation of the gas with the particles. The gas (e.g. nitrogen) may be heated prior to its flow along the gas flow path.

In some embodiments, the method further comprises introducing a solvent e.g. water, an organic solvent such as an alcohol (e.g. ethanol) or an inorganic solvent into the chamber.

In preferred embodiments of the process, the carrier particles have a particle size of at least 4 times that of the guest particles (when measured using a laser diffraction particle size analyser that measures particle volume).

In some embodiments, the guest particles or carrier particle may be a pharmaceutically active species e.g. an NSAID such as ibuprofen or a respiratory drug such as theophylline.

In some embodiments, the guest particles or carrier particle may be a polymeric carrier particle such as microcrystalline cellulose (MCC).

In some embodiments, the guest and carrier particles may have the same chemical identity but with differing particle sizes—e.g. the carrier particles have a particle size of at least 4 times that of the guest particles (when measured using a laser diffraction particle size analyser which measure particle volume). This has been found to enhance the flowability of the material as the finer guest particles are adhered to the surface of the larger carrier particles.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
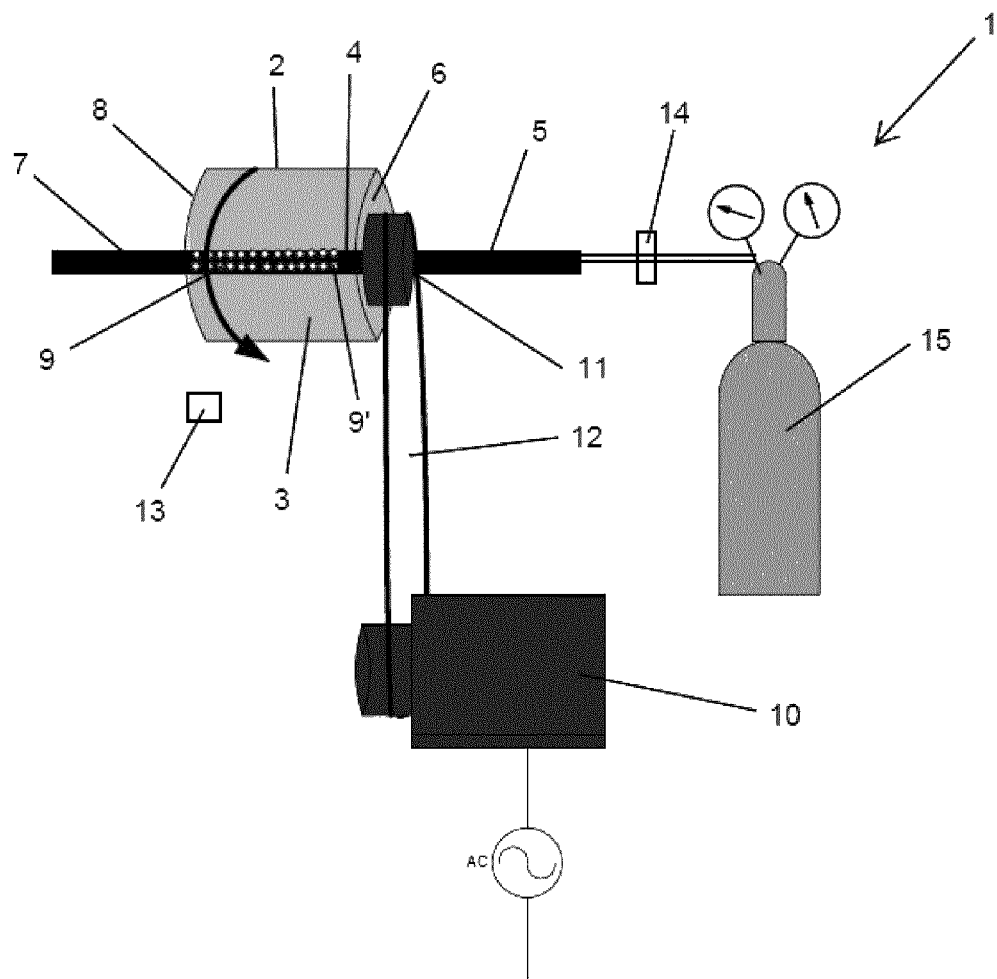
FIG. 1 shows a schematic representation of a first embodiment of the apparatus according to the first aspect of the present invention.

FIG. 1 shows a first embodiment of an apparatus 1 for coating carrier particles with guest particles. The apparatus comprises a cylindrical processing vessel 2 formed of acrylic and having smooth inner walls. The vessel 2 is rotatable about its axis and has solid walls defining a chamber 3 having a volume of around 500 cm3. A hollow shaft 4 formed of stainless steel extends within the chamber 3 along the axis of the vessel 2. The hollow shaft defines a gas flow path connected to a gas inlet 5 located at one axial end 6 of the vessel 2 and connected to a gas outlet 7 at the opposing axial end 8 of the vessel 2.

The hollow shaft 4 comprises four rows of axially aligned apertures 9 circumferentially-spaced around the shaft. The apertures 9 extend from the gas flow path within the hollow shaft 4 into the chamber 3.

The rows of apertures are selectively blockable so that during processing, one, two or three rows may be blocked.

The apertures 9 have an adjustable diameter to focus the gas flow into the chamber 3 and the apertures 9' towards the axial ends of the hollow shaft 4 include a respective flow director (not shown) which angles the gas flow towards the axial ends of the chamber 3.

The apparatus 1 further comprises a driving motor 10 for driving rotation of the vessel 2. The driving motor 10 is linked to a hub 11 affixed to axial end 6 of the vessel 2 adjacent the gas inlet 5 via a belt 12. The hollow shaft 4 passes through the axial centre of the hub 11.

The driving motor 10 is adapted to rotate the vessel 2 and hub 11 via the belt 12 at a speed of up to 4000 rpm. The driving motor includes a rotation sensor (not shown) for monitoring and maintaining the speed of rotation of the hollow shaft 4.

The apparatus 1 further comprises an infra-red temperature sensor 13 mounted externally of the chamber for monitoring the temperature within the chamber.

The apparatus 1 further comprises a pressure regulating system 14 for regulating the pressure within the chamber to ensure that there is no build-up of pressure within the chamber 3.

The rotation sensor, temperature sensor 13 and pressure regulating system 14 provide feedback to a computer system (not shown) running LabVIEW software.

The apparatus 1 further comprises a nitrogen source 15 connected to the gas inlet 5. The gas source 15 is adapted to provide nitrogen at a pressure of up to 80 psi e.g. between 20-80 psi at the gas inlet 5.

To use the apparatus 1, carrier particles and guest particles are placed within the chamber 3 of the vessel 2. These are introduced at either end of the chamber before the hollow shaft is fitted and sealed to the chamber (using stainless steel gaskets).

The carrier particles have a particle size of at least 4 times that of the guest particles (when measured using a laser diffraction particle size analyser which measure particle volume). There is preferably 5 times the number of guest particles to the number of carrier particles.

The gas inlet 5 is connected to the nitrogen gas supply 15.

The vessel 2 is rotated at a speed of up to 4000 rpm by the driving motor 10 and belt 12 which rotate the hub 11 which is affixed to the axial end 6 of the vessel 2.

As the vessel 2 rotates, the particles are subjected to centrifugal forces which force them towards the smooth inner surface of the walls of the vessel 2.

Nitrogen from the nitrogen source 15 flows to the gas inlet 5 and through the hollow shaft 4 along the gas flow path. The remainder of the gas passes into the chamber 3 through the four rows of apertures 9.

The gas passing though the apertures 9 will emanate in a radially outwards direction which will be coincident with the centrifugal force and thus will increase the collision force of the particles against the inner surface of the solid walls of the vessel. This, in turn, will increase the force with which the guest particles are imbedded into the carrier particles and thus will increase the adhesion between the two particles.

As the apertures 9 are in row which extend axially along the hollow shaft 4, the air exiting the hollow shaft 4 will form axially-extending "air blades" which increase the shear forces applied to the particles and thus further increase adhesion between the particles.

Experimentation using various carrier and guest particles have been carried out as discussed below.

Example 1—Studies on MCC/Ibuprofen Hybrid

Micro crystalline cellulose (MCC) is one of the most widely used excipients in drug formulations, in particular in oral dosage formulations.

Ibuprofen is widely used non-steroidal anti-inflammatory drug for relieving pain and for reducing fever and inflammation.

Dissolution Rate

A physical mixture of MCC and ibuprofen (10% w/w/ ibuprofen) was prepared as a control sample. The particles were physically mixed by vigorous hand mixing for 5 minutes.

A MCC/ibuprofen hybrid was produced using the apparatus/process of the present invention. MCC carrier particles (180-250 micron particle size) and ibuprofen guest particles (in the form of a fine powder—38-53 micron particle size) were added to the chamber of the cylindrical processing vessel and the vessel was rotated at a speed of 1500 rpm for 60 minutes with a nitrogen pressure of 40 psi.

Figure 2:
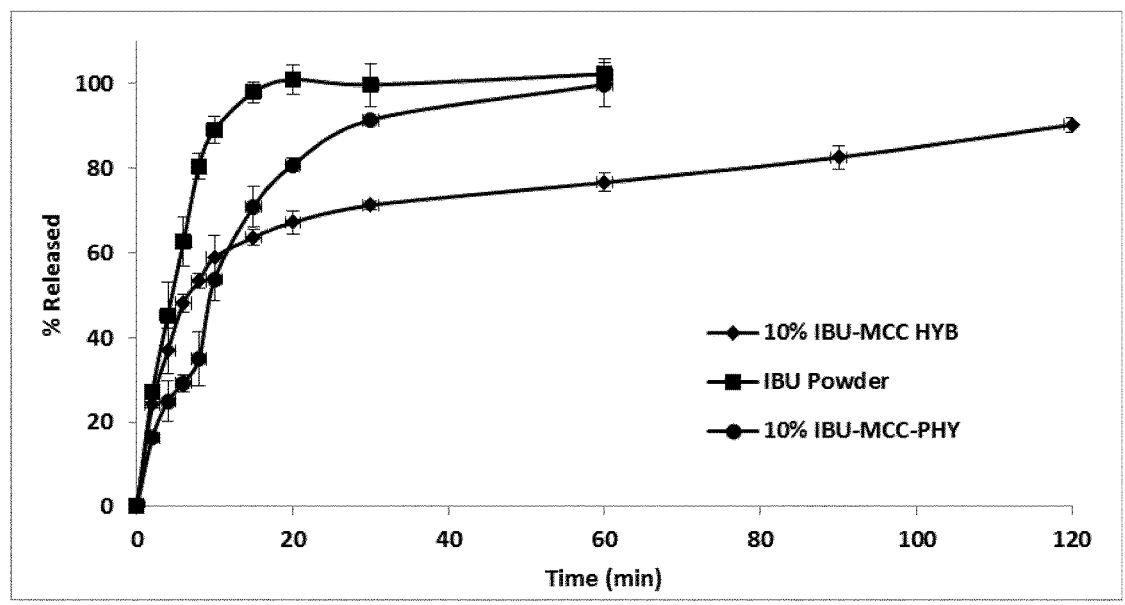
FIG. 2 shows dissolution rate for MCC/ibuprofen physical mixtures and hybrids.

The dissolution rate of ibuprofen powder alone, the MCC/ ibuprofen physical mixture (IBU-MCC-PHY) and the MCC/ ibuprofen hybrid were determined using the USP Basket Method at 50 rpm measured in phosphate buffer at pH 7.2 and 37° C. The results are shown in FIG. 2.

It can be seen that the physical mixture has a dissolution rate that was slower than the ibuprofen powder but a dissolution of greater than 90% was achieved by 30 minutes. At 30 minutes, the dissolution of the MCC/IBU hybrid was only around 70%.

The slow release from the hybrid compared to the physical mixture is attributed to the strong adhesion of the ibuprofen guest particles to the MCC carrier particles.

Concentration Dependency

Figure 3:
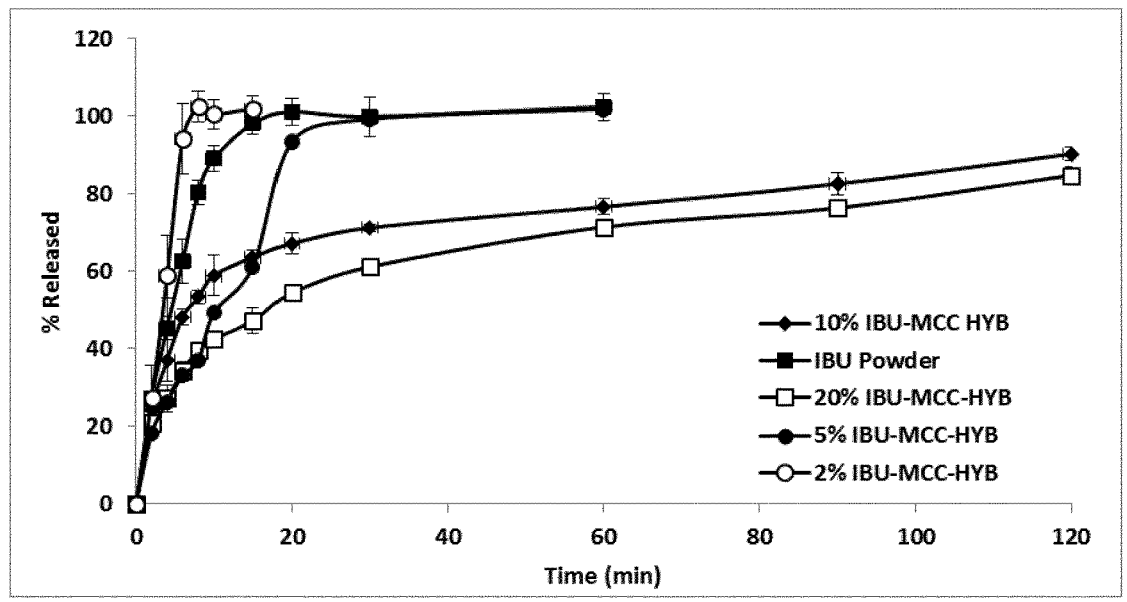
FIGS. 3 and 4 show the concentration dependency of the dissolution rate for MCC/ibuprofen hybrids.
Figure 4:
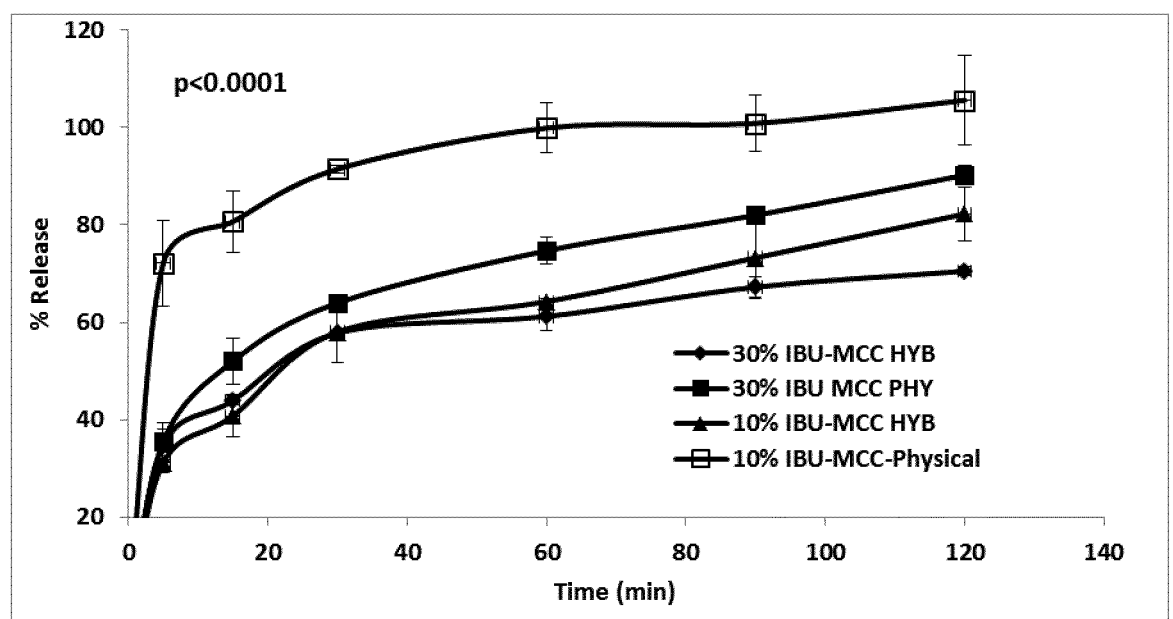

Next, the concentration dependency of the dissolution rate was measured (using the method described above) and the results are shown in FIGS. 3 and 4.

The dissolution rate of ibuprofen is reduced with increasing concentration possibly as a result of the increase in ibuprofen guest particles on each MCC carrier particle.

Attrition Study

Experiments were carried out using laser diffraction techniques to determine the extent of attrition of the carrier particles using the apparatus and process of the present invention. The results are shown in Table 1 and FIG. 6.

TABLE 1

| Ingredient/or % IBU in MCC | x10 (μm) | x50 (μm) | x90 (μm) | VMD (μm) |
|---|---|---|---|---|
| MCC (180-250 μm) | 41.75 ± 3.88 | 119.69 ± 4.52 | 160.28 ± 1.76 | 112.1 ± 4.38 |
| MCC (250-355 μm) | 76.59 ± 28.51 | 130.88 ± 2.18 | 164.66 ± 0.77 | 124.57 ± 3.53 |
| IBU (38-53 μm) | 6.54 ± 0.66 | 22.88 ± 1.07 | 47.78 ± 1.89 | 25.4 ± 1.24 |
| 5% IBU (HYB) | 68.53 ± 33.40 | 130.14 ± 1.03 | 164.38 ± 0.32 | 122.11 ± 2.98 |
| 5% IBU (PHY) | 51.39 ± 32.05 | 130.05 ± 1.28 | 164.41 ± 0.39 | 120.97 ± 3.26 |
| 10% IBU (HYB) | 46.79 ± 5.68 | 130.97 ± 3.1 | 164.72 ± 2.12 | 122.71 ± 3.29 |
| 10% IBU (PHY) | 29.38 ± 10.11 | 126.32 ± 1.29 | 163.09 ± 1.29 | 115.11 ± 4.47 |
| 20% IBU (250-355) (HYB) | 7.4 ± 0.97 | 89.66 ± 43.94 | 157.90 ± 4.59 | 84.66 ± 14.13 |
| 20% IBU (250-355) (PHY) | 5.38 ± 0.14 | 28.86 ± 6.31 | 140.67 ± 17.56 | 54.26 ± 14.18 |

The VMD is the volume mean diameter and the x10, x50 and x90 values are the average particle size of the smallest 10%, 50% and 90% of particles.

The results show that the MCC/ibuprofen hybrid particles have a larger x10 value than the corresponding physical mixture thus suggesting that there is no attrition of the carrier particles.

Figure 6:
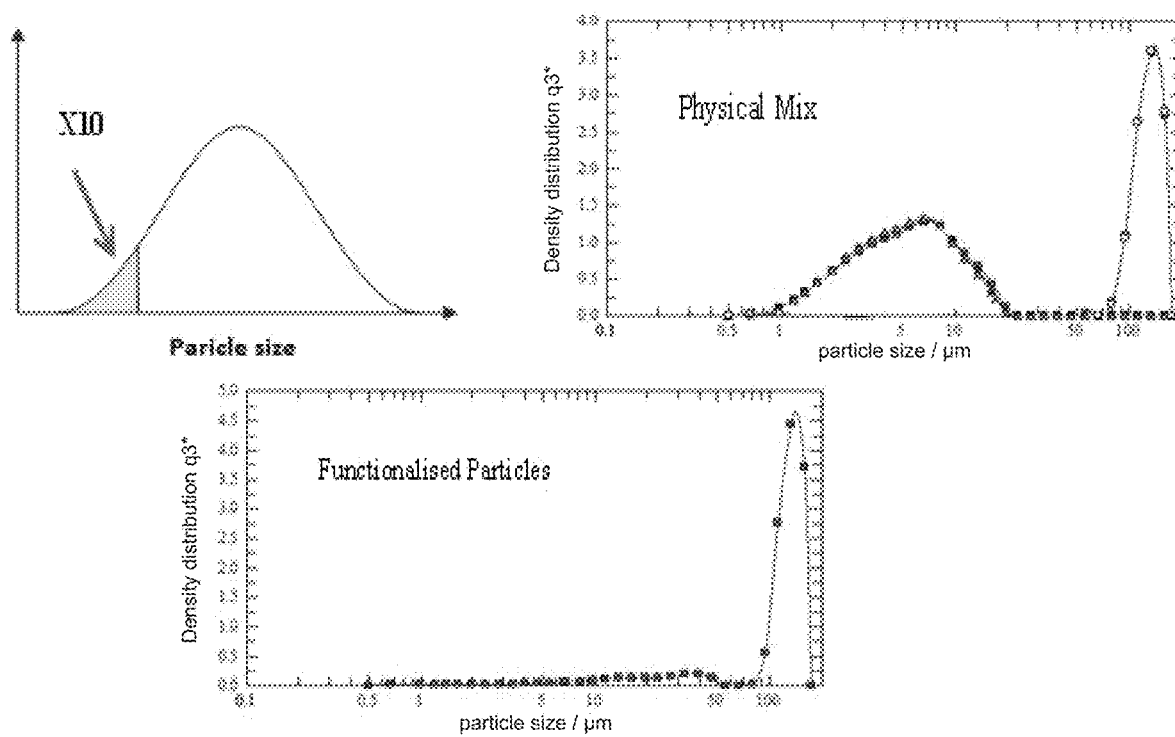
FIG. 6 shows particle size distribution for MCC/ibuprofen physical mixtures and hybrids.

In FIG. 6, for the physical mixture, two peaks are shown corresponding to the guest and carrier particles. For the hybrid, a single peak indicates that the fine particles have become embedded in the larger carrier particles.

Infra-Red Study

Figure 7:
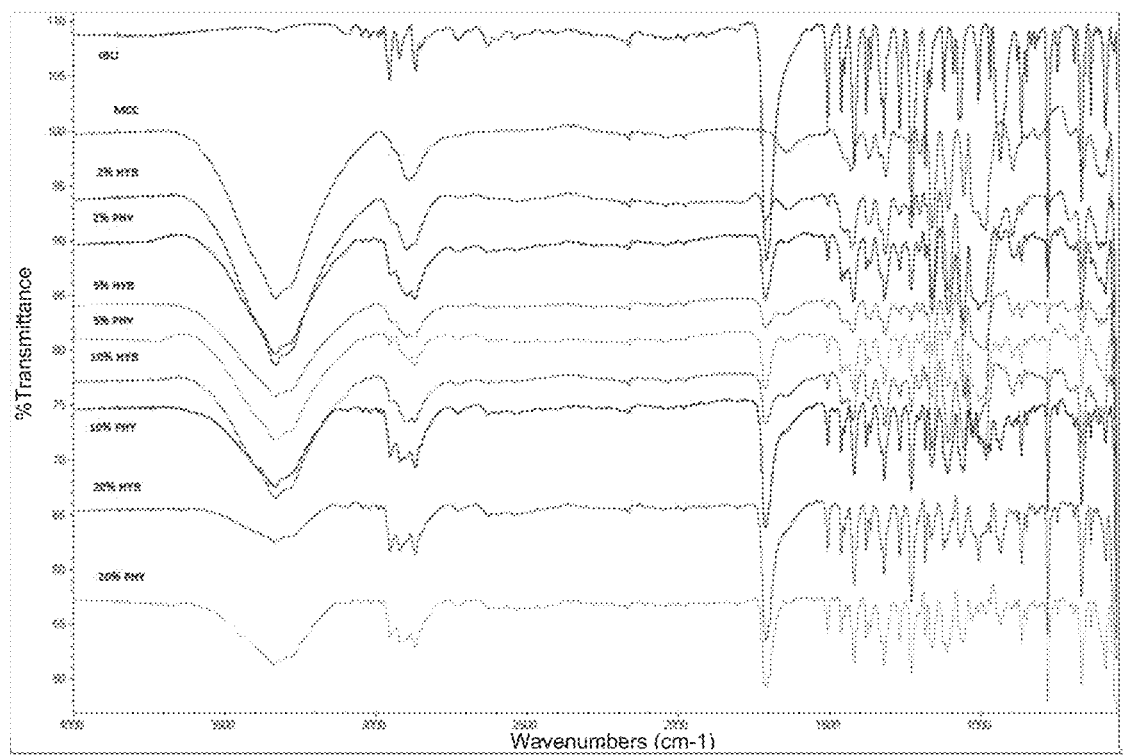
FIG. 7 shows FTIR spectra for MCC/ibuprofen physical mixtures and hybrids.

FIG. 7 shows a series of FTIR spectra showing that the carbonyl peak at 1708.27 cm−1 arising from the C=O stretching is reduced in intensity for the hybrid MCC/ibuprofen particles. This is the result of the formation of hydrogen bonds between the ibuprofen carbonyl group and the hydroxyl group of the MCC.

Example 2—Studies on Polymer/Ibuprofen Hybrids

Example 1 was repeated using the following polymers in place of MCC: HPMC 100K, Polyox-N-10, MCC-PH-200, Starcap 1500 and Ethocel ST4.

Hydroxyl propyl methyl cellulose (HPMC) is widely used in controlled drug delivery systems either alone or in combination with other hydrophilic polymers such as HPC (hydroxypropylcellulose). The grade used in these examples was K100M premium—a high viscosity polymer with viscosity ranging between 75,000-140,000 mPa·s (2% solution in water at 20° C.). Methoxyl substitution was 19-24%, hydroxypropyl substitution was 7-12%, and particle size range used in this experiment was 180-250 pm.

POLYOX® is non-ionic poly-(ethylene oxide) polymer used in extended release applications of osmotic pump technologies, hydrophilic matrices, gastro-retentive dosage forms and other drug delivery systems such as transdermal and muco-adhesive technologies. POLYOX-N-10 is a water soluble resin with a low molecular weight and viscosity and a particle size range of used in this experiment was 180-250 pm.

Starcap 1500 is a pregelatinised corn starch used sustained release formulation where it is included to prevent dose dumping from hydrophilic controlled release formulations. The particle size range used was 180-250 pm.

Ethocel ST4 is a hydrophobic (ethyl substituted) cellulose ether that has applications as a tablet binder, matrix forming material, and in microencapsulation and microspheres. The degree of substitution ranges from 2.25-2.81 and the ethoxy content ranges between 44-52.5%. In this example, the particle size range was 250-355 pm.

MCC Avicel-PH 200 is microcrystalline cellulose used in solid dosage forms both for direct compression and wet granulation. The particle size range used in this example was 180¬1250 pm.

Figure 8:
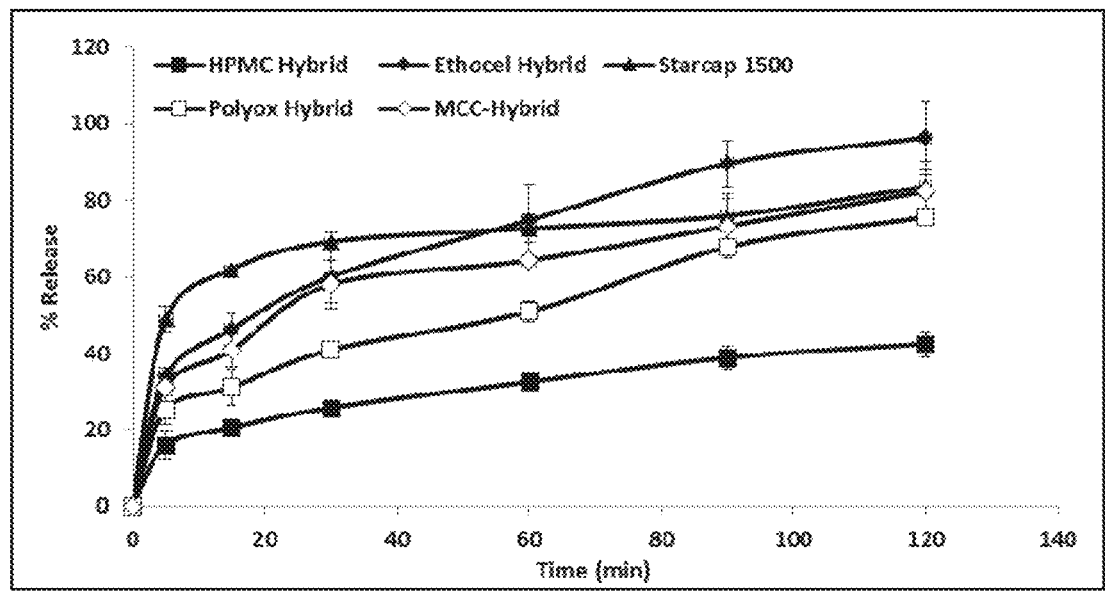
FIG. 8 shows dissolution rate for various polymer/ibuprofen physical mixtures and hybrids.

The results are shown in Table 2 below and FIG. 8.

TABLE 2

| | Polymer | % Release after 120 minutes Hybrid/Dry coated particles | % Release after 120 minutes Physically mixed particles | P value using two way ANOVA |
|---|---|---|---|---|
| 1- | HPMC 100K | 42.45 ± 3.26 | 58.17 ± 4.02 | P < 0.0001 |
| 2- | POLYOX-N-10 | 75.61 ± 1.98 | 104.14 ± 4.86 | P < 0.0001 |
| 3- | MCC-PH-200 | 82.29 ± 5.51 | 105.59 ± 9.21 | P < 0.0001 |
| 4- | Starcap 1500 | 83.59 ± 6.59 | 106.41 ± 2.34 | P < 0.0001 |
| 5- | Ethocel ST 4 | 96.30 ± 9.53 | 103.53 ± 8.89 | P > 0.05 |

The results show that the release of ibuprofen was hindered when compared to the physical mixture in all polymers tested.

Example 3—Studies on Polymer/Theophylline Hybrids

Theophylline is widely used in the treatment of respiratory diseases.

The following carrier polymers were used: HPMC 100K, Polyox-N-10, MCC-PH-200, and Ethocel ST4.

A physical mixture of polymer and theophylline (10% w/w theophylline) was prepared as a control sample. The particles were physically mixed by vigorous hand-mixing for 5 minutes.

A polymer/theophylline hybrid was produced using the apparatus/process of the present invention. Polymer carrier particles (250-355 micron particle size) and theophylline guest particles (in the form of a fine powder—38-53 micron particle size) were added to the chamber of the cylindrical processing vessel and the vessel was rotated at a speed of 1500 rpm for a processing time of between 60 and 180 minutes with a nitrogen pressure of 60 psi.

Figure 9:
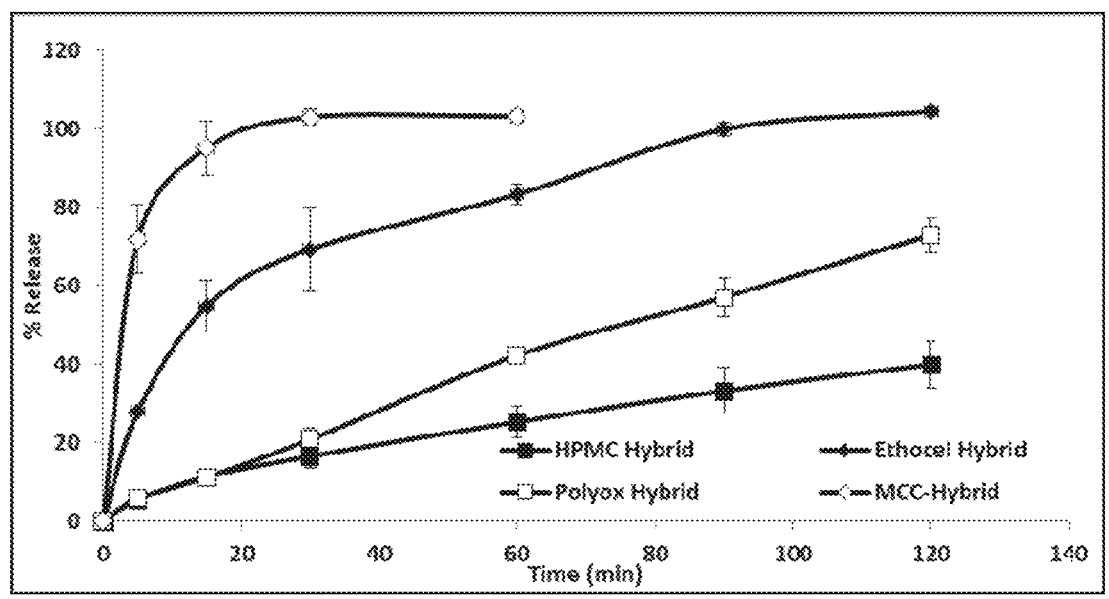
FIG. 9 shows dissolution rate for various polymer/theophylline physical mixtures and hybrids.

The dissolution rate of theophylline powder alone, the polymer/theophylline physical mixture and the polymer/theophylline hybrid were determined using the USP Basket Method at 50 rpm measured in phosphate buffer at pH 7.2 and 37° C. The results are shown in Table 3 and FIG. 9.

TABLE 3

| | Polymer | % Release after 120 minutes Hybrid/Dry coated particles | % Release after 120 minutes Physically mixed particles | P value using two way ANOVA |
|---|---|---|---|---|
| 1- | HPMC 100K | 39.91 ± 6.03 | 54.04 ± 4.80 | $P < 0.0001$ |
| 2- | POLYOX-N-10 | 72.95 ± 4.45 | 83.84 ± 0.87 | $P < 0.0001$ |
| 3- | MCC-PH-200 | 103.51 ± 1.71 | 100.11 ± 4.89 | $P > 0.05$ |
| 4- | Ehtocel ST 4 | 104.41 ± 1.38 | 81.37 ± 2.703 | $P = 0.0001$ |

Example 4—Studies on Silicon Dioxide/Ibuprofen Hybrids

A silicon dioxide (Aerosil 200)/ibuprofen hybrid was produced using the apparatus/process of the present invention. Ibuprofen carrier particles (45 micron particle size) and silicon dioxide guest particles (12 nm particle size) were added to the chamber of the cylindrical processing vessel and the vessel was rotated at a speed of 2000 rpm for a processing time of between 2 and 10 minutes with a nitrogen pressure of 40 psi.

Powder flow characteristics were studied by measuring bulk density and the angle of repose (AOR). Results are shown in Table 4.

TABLE 4

| | Bulk Density | Improvement | AOR | Category |
|---|---|---|---|---|
| Ibuprofen | 0.344 ± 0.01 | — | 41.93 ± 1.59 | Passable |
| IBU + 0.5% Aerosil 200 physical mixture | 0.353 ± 0.01 | 2.62% | 37.80 ± 0.30 | Fair |
| IBU + 0.5% Aerosil Hybrid mixture -5 min | 0.418 ± 0.01 | 21.53% | 28.87 ± 0.74 | Good |
| IBU + 0.5% Aerosil Hybrid mixture-10 min | 0.452 ± 0.01 | 31.49% | 25.82 ± 0.29 | Excellent |

The results demonstrate an increase in bulk density upon dry powder coating with 21.5% increase in bulk density after 5 minutes that was further enhanced following 10 minutes processing with an increase of 31.49%.

The results also show that the flow characteristics are improved in the hybrid particles (evidenced by a decrease in the angle of repose).

Example 5—Confocal Laser Scanning Microscopy Study

In order to observe the extent of coating of the guest particles onto the carrier particle, a study using rhodamine B (a known fluorescent probe) as the guest particles and MCC as the carrier particles.

An MCC/rhodamine hybrid was produced using the apparatus/process of the present invention. MCC carrier particles (300 micron particle size) and rhodamine B guest particles (in the form of a fine powder—18 micron particle size) were added to the chamber of the cylindrical processing vessel and the vessel was rotated at a speed of 2000 rpm for a processing time of 20 minutes with a nitrogen pressure of 45 psi.

The particles were then observed on a Leica Microsystem confocal microscope (TCS SP5 II) and fluorescence micrographs of the hybrid particles were obtained using a confocal microscope equipped with a Tunable Multiphoton Laser z-stacking_and Retiga 2000R Camera, and excitation, dichroic, and emission filters appropriate for the observation of rhodamine B fluorescence.

Figure 10:
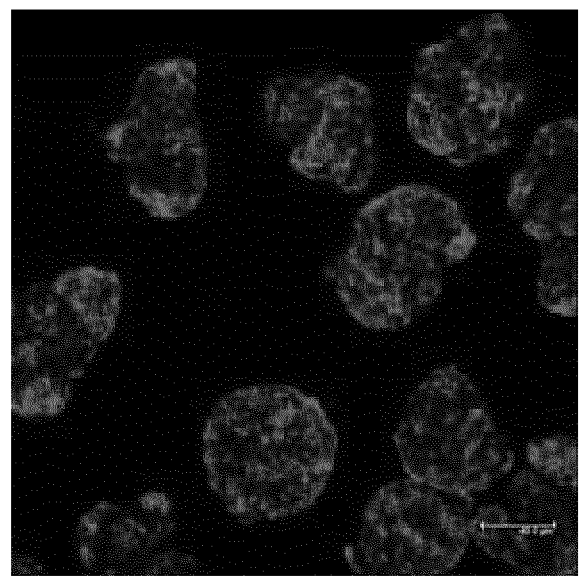
FIG. 10 shows confocal microscopy pictures of MCC coated with rhodamine particles.

FIG. 10 shows the confocal microscopy pictures for the hybrid particles. It can be seen that there is even coverage of the MCC carrier particles with the fluorescent guest particles.

Example 6—SEM Study

Figure 5:
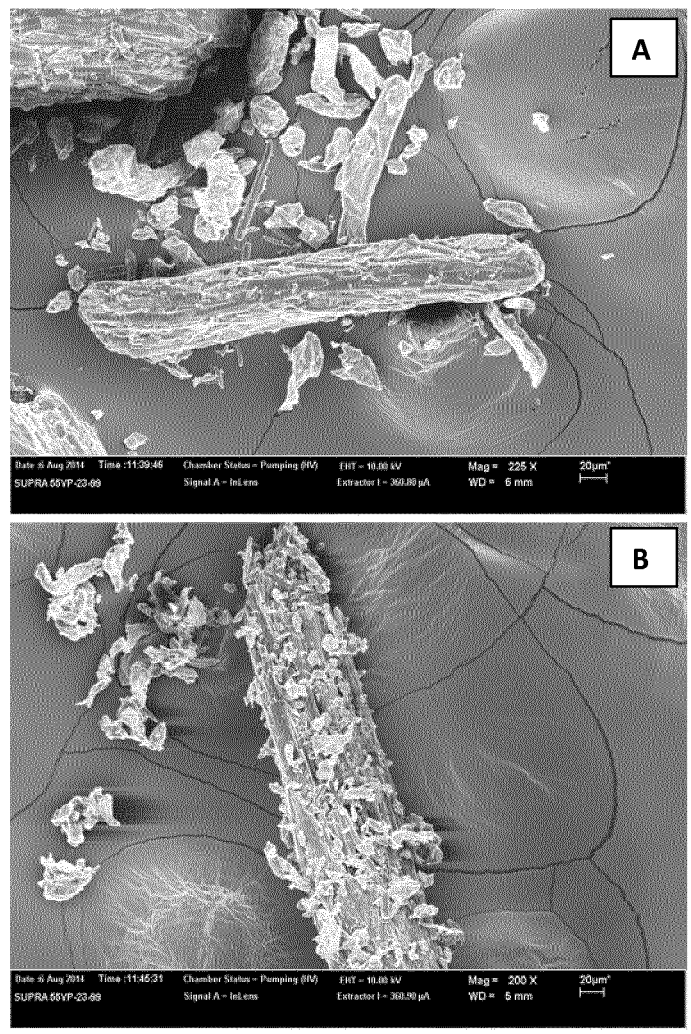
FIGS. 5A and B shows SEM photographs of hydroxyl propyl methyl cellulose (HPMC) guest particles adhered to the surface of a theophylline carrier particle.

SEM photographs of HPMC guest particles adhered to the surface of a theophylline carrier particle are shown in FIGS. 5A and B.

These photographs shows that the surface of the theophylline carrier particles in the theophylline/HPMC hybrid (FIG. 5B) are coated with HMPC guest particles whereas the theophylline carrier particles in the physical mixture (FIG. 5A) are not carrying any HPMC particles.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An apparatus for coating carrier particles with guest particles, the apparatus comprising:
    a cylindrical processing vessel rotatable about its axis comprising opposing first and second end walls and an unperforated circumferentially extending wall that extends from the first end wall to the second end wall so as to define a chamber for receiving said carrier particles and guest particles; and
    a hollow shaft extending within said chamber at least partly along the axis of the cylindrical processing vessel, the hollow shaft defining a gas flow path connected to a gas inlet,
    the hollow shaft comprising one or more axially-extending slots or one or more axially-extending rows of apertures allowing fluid communication between the gas flow path and the chamber.

2. Apparatus according to claim 1 wherein the one or more axially-extending slots is/are one or more axially- or helically-extending, circumferentially-spaced slots.

3. Apparatus according to claim 2 wherein the apertures in the or each axially-extending row of apertures are arranged in an axially-aligned and axially-extending row or in a helically-extending row.

4. Apparatus according to claim 1 comprising a plurality of the axially-extending slots/rows of apertures, and wherein said plurality of axially-extending slots/rows of apertures are equally spaced around the circumference of the hollow shaft.

5. Apparatus according to claim 1 wherein the hollow shaft and the gas flow path extend along the entire length of the axis of the cylindrical processing vessel to a gas outlet.

6. Apparatus according to claim 1 further comprising a temperature sensor.

7. Apparatus according to claim 1 further comprising a pressure monitor.

8. Apparatus according to claim 1 further comprising a gas source connected to the gas inlet and adapted to provide gas at a pressure of up to 80 psi at the gas inlet.

9. Apparatus according to claim 8 further comprising a gas heater for heating the gas prior to the gas inlet.

10. Apparatus according to claim 1 comprising an electromagnetic emitter for providing electromagnetic radiation to the chamber.

11. An apparatus according to claim 1 wherein the driving motor rotates the cylindrical processing vessel at a speed of between 800 and 4000 rpm.

12. An apparatus according to claim 1 wherein the driving motor rotates the cylindrical processing vessel at a speed of between 1500 and 4000 rpm.

13. An apparatus according to claim 1 wherein the one or more axially-extending slots or one or more axially-extending rows of apertures are configured such that gas discharged therefrom forms an axially-extending blade or sheet of gas.

14. An apparatus according to claim 1 wherein the unperforated circumferentially extending wall comprises a smooth inner surface defining the chamber.

15. An apparatus according to claim 14 wherein the smooth inner surface is free of baffles.

16. An apparatus according to claim 1 comprising a driving motor that rotates the cylindrical processing vessel at a speed of between 100 and 4000 rpm such that collision of the carrier particles against the one or more walls of the cylindrical processing vessel effects coating of said carrier particles with said guest particles.

17. An apparatus for coating carrier particles with guest particles, the apparatus comprising:
    a cylindrical processing vessel rotatable about its axis comprising opposing first and second end walls and a circumferentially extending wall that extends from the first end wall to the second end wall, the circumferentially extending wall comprising a smooth inner surface defining a chamber for receiving said carrier particles and guest particles; and
    a hollow shaft extending within said chamber at least partly along the axis of the cylindrical processing vessel, the hollow shaft defining a gas flow path connected to a gas inlet,
    the hollow shaft comprising one or more axially-extending slots or one or more axially-extending rows of apertures allowing fluid communication between the gas flow path and the chamber, the one or more slots or one or more rows of aperture being configured such that gas discharged therefrom forms an axially extending blade or sheet of gas.

18. An apparatus according to claim 17 further comprising a driving motor that rotates the cylindrical processing vessel at a speed being such that collision of the carrier particles against the one or more circumferential walls of the cylindrical processing vessel effects coating of said carrier particles with said guest particles.

19. An apparatus according to claim 17 wherein the smooth inner surface is free of baffles.

* * * * *